United States Patent [19]
Aikawa et al.

[11] Patent Number: 5,680,773
[45] Date of Patent: Oct. 28, 1997

[54] REFRIGERANT EVAPORATOR HAVING UPSTREAM AND DOWNSTREAM TANKS OF DIFFERENT CROSS SECTIONS

[75] Inventors: Yasukazu Aikawa, Nagoya; Yoshiharu Kajikawa, Hekinan; Eiichi Torigoe, Kariya, all of Japan

[73] Assignee: Denso Corporation, Kariya, Japan

[21] Appl. No.: 739,934

[22] Filed: Oct. 30, 1996

[30] Foreign Application Priority Data

Dec. 22, 1995 [JP] Japan .................................... 7-335426

[51] Int. Cl.$^6$ .................................................. F25B 39/02
[52] U.S. Cl. .................. 62/526; 165/153; 165/DIG. 466
[58] Field of Search ...................... 62/524, 526; 165/146, 165/153, DIG. 466

[56] References Cited

U.S. PATENT DOCUMENTS 4,712,612 12/1987 Okamoto et al. .......................... 52/526
5,099,913 3/1992 Kadle ......................................... 62/526
5,125,453 6/1992 Bertrand et al. ................. 165/DIG. 466
5,152,337 10/1992 Kawakatsu et al. ..................... 165/153

FOREIGN PATENT DOCUMENTS

712778 U  3/1995  Japan .

Primary Examiner—William E. Tapolcai
Attorney, Agent, or Firm—Harness, Dickey & Pierce

[57] ABSTRACT

A refrigerant evaporator has, at each of a downstream side and an upstream side with respect to a flow direction of air, a pair of upper and lower tanks and a tube connecting the tanks. A refrigerant flows from the pair of tanks and the tube at the downstream side to the pair of tanks and the tube at the upstream side to cool the air flowing outside the tubes. The tanks at the upstream side are formed in an elliptic shape in cross section and the tanks at the downstream side are formed in a circular shape in cross section. The shorter diameter of the elliptic shape lies in a longitudinal direction of the tubes and is the same as the diameter of the circular shape.

10 Claims, 1 Drawing Sheet

REFRIGERANT EVAPORATOR HAVING UPSTREAM AND DOWNSTREAM TANKS OF DIFFERENT CROSS SECTIONS

CROSS REFERENCE TO RELATED APPLICATION

This application is based on and claims a priority of Japanese Patent Application No. 7-335426 filed on Dec. 22, 1995, the content of which is incorporated herein by reference.

BACKGROUND OF THE INVENTION

1. Field of the Invention

The present invention relates to a refrigerant evaporator used for a cooling apparatus and, more particularly, to a refrigerant evaporator which has a high heat exchange efficiency and is suitable for product size reduction.

2. Description of Related Art

Various refrigerant evaporators are used as a cooling unit in an air conditioning system of a vehicle. JP-U 7-12778 proposes a refrigerant evaporator for an air conditioning system of a vehicle. The refrigerant evaporator comprises a plurality of core bodies aligned in parallel, upper and lower tanks connecting the core bodies at an upstream side and a downstream side with respect to an air flow, and corrugated fins disposed between the core bodies in contact therewith.

As shown schematically in FIG. 3, each core body 1 has two longitudinally extending refrigerant flow passages 13A and 13B separated from each other and having circular openings 531, 541, 551 and 561 which are connected to the tanks (not shown) at the four corners. The refrigerant passages 13A and 13B communicate with the corresponding refrigerant passages of the adjacent core body through the tanks. The refrigerant flows, for example, from the upper opening 541 to the lower opening 561 through the refrigerant passage 13B at the downstream side with respect to an air flow direction and then from the lower opening 551 to the upper opening 531 through the refrigerant passage 13A at the upstream side. Thus, the refrigerant flowing through the passages 13A and 13B cools via the corrugated fins the air passing between the core bodies 1.

The openings 531, 541, 551 and 561 as well as the tanks are provided to have the same cross-sectional opening area (flow area) for the refrigerant. In view of the dryness of the refrigerant which influences on the flow smoothness and is larger at the upstream side than at the downstream side because of the heat exchange with air, and the cross-sectional area is so determined as to assure smooth flow of the refrigerant in the openings 531 and 551 at the upstream side. This configuration of the openings will unnecessarily restrict the effective area for the heat exchange (e.g., length L2 of the fluid passage 13B) at the downstream side. Further, this opening configuration will impede the recent requirements that the effective heat exchange (cooling) area should be as large as possible and the entire product size of the evaporator should be as compact as possible.

SUMMARY OF THE INVENTION

It is an object of the present invention to provide a refrigerant evaporator which has a large effective cooling area.

It is a further object of the present invention to provide a refrigerant evaporator which has a high cooling efficiency in a compact product size.

According to the present invention, a refrigerant evaporator has a pair of upper and lower tanks at an upstream side and a pair of upper and lower tanks at a downstream side with respect to the air flow direction. The tanks at the downstream side has respective refrigerant flow passages smaller in cross section than those of the tanks at the upstream side. The refrigerant, which flows in the tanks at the downstream side, has a smaller dryness and a smaller specific volume. Therefore, even if the cross-sectional area of the tanks at the downstream side is reduced, the flow resistance therein will not increase so much and the refrigerant flows smoothly. With the reduced cross-sectional area, tubes connecting the upper and the lower tanks and functioning as an effective part for air cooling operation can have longer length, which provides the air cooling operation efficiently without increasing the entire product size.

Preferably, the tanks at the upstream side have an elliptic cross-sectional shape and the tanks at the downstream side have a circular cross-sectional shape. The shorter diameter of the elliptic shape is in the longitudinal direction of the tubes and is the same as the diameter of the circular shape. This configuration provides a sufficiently large cross-sectional area of the tanks at the upstream side and ensures smooth flow of the refrigerant having a large dryness. Further, this configuration assures the tubes between the tanks at the upstream side to be lengthen for the efficient cooling of the air passing therethrough.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF A PRESENTLY PREFERRED EMBODIMENT

Figure 1:
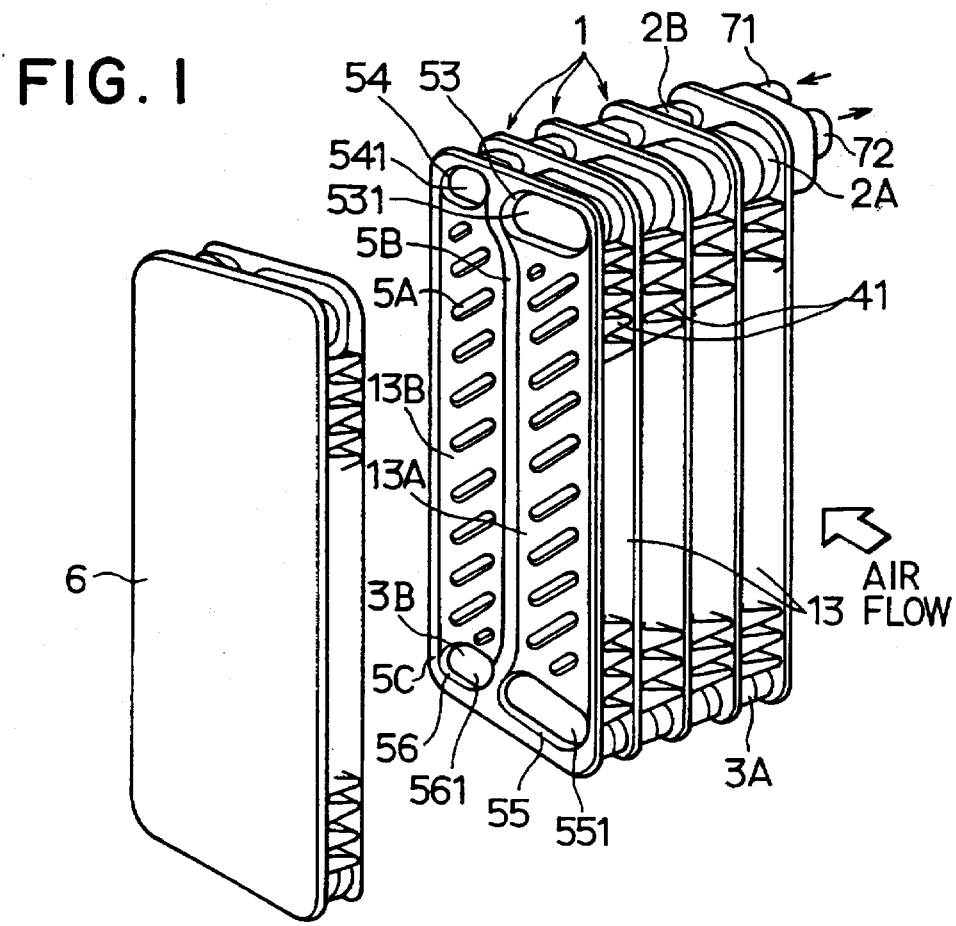
FIG. 1 is an exploded perspective view illustrating a refrigerant evaporator according to an embodiment of the present invention.
Figure 2:
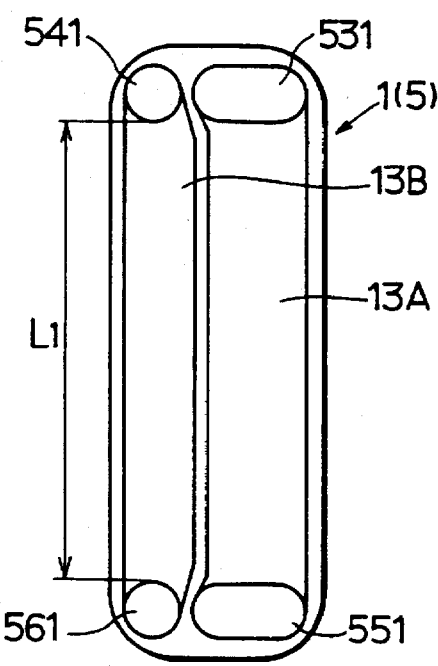
FIG. 2 is a schematic plan view of a core plate used for the refrigerant evaporator according to the embodiment.

A refrigerant evaporator according to an embodiment shown in FIGS. 1 and 2 has a plurality of core bodies (tubes) 1 stacked (laminated) each other in parallel in a direction transverse to air flow shown by an arrow. Each core body 1 is formed by lamination of a pair of elongated core plates 5. Each core plate 5 is formed in a shallow cup shape having ribs (inclined projections) 5A on the bottom, a partition wall (longitudinal projections) 5B on the bottom and a peripheral wall 5C extending from the bottom. Thus, two core plates 5 form therebetween two parallel refrigerant passages 13A and 13B defined by the partition wall 5B and the peripheral walls 5C and extending in the longitudinal direction transverse to the air flow direction. Adjacent two of the core bodies 1 form air flow passages 13 therebetween and a corrugated fin 41 is positioned in each air flow passage 13 in contact with the adjacent core bodies 1.

The refrigerant passages 13B at the downstream side are connected to a refrigerant inlet pipe 71 for refrigerant supply through upper tanks 2B, and the refrigerant passages 13A are connected to a refrigerant outlet pipe 72 for refrigerant return through upper tanks 2A. An end frame 6 is attached to the stacked core bodies 1 and communicates the downstream tanks 2B and 3B to the upstream tanks 2A and 3A therethrough.

The core plate 5 is formed with an upper and a lower recesses 53 and 55 at an upstream side with respect to the air flow direction and an upper and a lower recesses 54 and 56 at a downstream side. The downstream recesses 54 and 56 are formed at the longitudinal ends of the core plate 5 and have respective circular openings 541 and 561 thereby to form downstream tanks 2B and 3B, which extends in the air passage 13 perpendicularly in the to the core plate 5 when the core bodies 1 are stacked. The upstream recesses 53 and 55 are formed at the longitudinal ends of the core plate 5 and have respective elliptic openings 531 and 551 thereby to form upstream tanks 2A and 3A, which extends in the air passage 13 perpendicularly to the core plate 5 when the core bodies 1 are stacked.

The openings 531 and 551 for the upstream tanks 2A and 3A are formed in a generally elliptic shape extending in the air flow direction. That is, the longer diameter and the shorter diameter of the upstream openings 531 and 551 are in line with the air flow direction (horizontal direction in the figures) and the longitudinal direction of the core plate 5 (vertical direction in the figures), respectively. The shorter diameter of the elliptic openings 531 and 551 is set to the same as the diameter of the circular openings 541 and 561. As a result, the downstream circular openings 541 and 561 have a smaller flow area in cross section than the upstream elliptic openings 531 and 551.

With the upstream openings 531 and 551 having the same flow area as that of the conventional upstream openings (531 and 551 in FIG. 3), the downstream openings 541 and 561 have the smaller flow area. The dryness of the refrigerant flowing in the downstream tanks 2B and 3B is lower than in the upstream tanks 2A and 3A and, hence, its specific volume is small. Because the weight flow volume of the refrigerant in the downstream tanks 2B and 3B is considered constant, the refrigerant flow speed is slow. As a result, pressure loss in the refrigerant flow can be suppressed even in the case that the flow area of the downstream tanks 2B and 3B are made smaller than that of the conventional one.

The refrigerant flow passage 13B communicating the upper and the lower openings 541 and 561 of which diameters are shortened has a width larger than the diameter of the openings 541 and 561 in the air flow direction, thereby assuring the efficient cooling operation of air. On the other hand, the refrigerant flow passage 13A communicating the upper and the lower openings 531 and 551 of which diameter in the air flow direction is lengthened has a width smaller than the longer diameter of the openings 531 and 551, thereby reducing a range of super heating.

Figure 3:
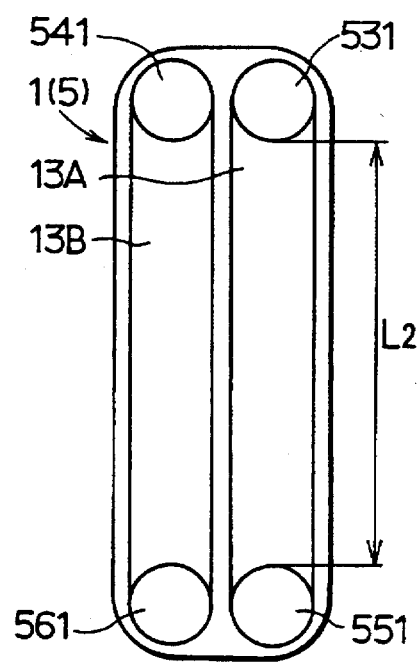
FIG. 3 is a schematic plan view of a core plate used for a conventional refrigerant evaporator.

Further, with the reduction in diameter of the downstream circular openings 541 and 561 and also in the shorter diameter of the upstream elliptic openings 531 and 551, the length L1 of the effective cooling area, i.e., effective heat exchanging area between the refrigerant flowing the refrigerant passages 13A and 13B inside the core bodies 1 and the air flowing in the air passages 13 outside the core bodies 1, is made longer than that L2 in the conventional evaporator shown in FIG. 3. As a result, cooling operation can be attained in higher heat exchanging efficiency without enlarging the entire product size or the product size can be reduced without lowering the cooling efficiency.

It is to be noted that, particularly in the case of the refrigerant evaporator having the upper and the lower tanks at both upstream and downstream sides with respect to the air flow direction as in the above-described embodiment, the vertical length of the tanks can be shortened greatly and the vertical length of the refrigerant flow passages can be lengthened greatly, which provides a remarkable advantage of the invention.

Although the vertical length of the refrigerant flow passage at the upstream side, either one or both of the upper and the lower openings (upper and lower tanks) at the upstream side may be formed in the circular or other shape as long as the upper and the lower openings (upper and the lower tanks) at the downstream side are shaped to have smaller flow area. In this case as well, the cooling efficiency can be improved.

The present invention having been described hereinabove should not be limited to the above-described embodiment and modifications thereof but may be implemented in other ways without departing from the scope and spirit of the present invention.

What is claimed is:

1. A refrigerant evaporator comprising:

a pair of upper and lower tanks provided, for passing a refrigerant therethrough, at each of an upstream side and a downstream side with respect to a flow direction of air to be cooled;

a downstream tube connected to the upper and the lower tanks at the downstream side for passing the refrigerant therethrough for cooling the air at the downstream side; and an upstream tube connected to the upper and the lower tanks at the upstream side for passing the refrigerant from the downstream side therethrough for cooling the air at the upstream side, wherein a cross-sectional flow area of the tanks at the downstream side is smaller than that of the tanks at the upstream side.

2. A refrigerant evaporator according to claim 1, wherein:

the tanks at the upstream side are formed in a non-circular shape having a smaller diameter and a larger diameter; and the shorter diameter is in a longitudinal direction of the tube at the upstream side and is substantially the same as a diameter of the tanks at the downstream side.

3. A refrigerant evaporator according to claim 2, wherein:

the tube at the downstream side has a width wider than the diameter of the tanks at the downstream side in the air flow direction; and the tube at the upstream side has a width narrower than the larger diameter of the tanks at the upstream side in the air flow direction.

4. A refrigerant evaporator according to claim 3, wherein:

the tanks at the upstream side are formed in an elliptic shape in cross section; and the tanks at the downstream side are formed in a circular shape in cross section.

5. A refrigerant evaporator comprising:

a plurality of core bodies stacked in parallel to each other leaving air passages between adjacent two thereof, each of the core bodies having a first and a second longitudinally extending refrigerant passages arranged in parallel in a flow direction of air passing through the air passages;

corrugated fins disposed in the air passages and in contact with the core bodies;

a first tank connecting the first refrigerant passages each other for supplying a refrigerant to the first refrigerant passages therethrough; and a second tank connecting the second refrigerant passages each other for returning the refrigerant received from the first tank, the second tank having a cross-sectional flow area larger than that of the supply side tank.

6. A refrigerant evaporator according to claim 5, wherein:

the first tank is formed in a circular shape having a uniform diameter in cross section; and the second tank is formed in an elliptic shape having a larger diameter in the direction of air flow and a smaller diameter substantially equal to the uniform diameter in a longitudinal direction of the second refrigerant passages.

7. A refrigerant evaporator according to claim 5, wherein:

the first tank is disposed downstream the second tank.

8. A refrigerant evaporator according to claim 5, wherein:

the first tank is disposed at an upper part and a lower part of the first refrigerant passage; and the second tank is disposed at an upper part and a lower part of the second refrigerant passage.

9. A refrigerant evaporator according to claim 5, wherein:

the first refrigerant passage has a width larger than that of the first tank in the flow direction of air; and the second refrigerant passage has a width smaller than that of the second tank in the flow direction of air.

10. A refrigerant evaporator according to claim 9, wherein:

the first tank is disposed downstream the second tank, disposed at an upper part and a lower part of the first refrigerant passage, and formed in a circular shape having a uniform diameter in cross section; and the second tank is disposed at an upper part and a lower part of the second refrigerant passage, and formed in an elliptic shape having a larger diameter in the direction of air flow and a smaller diameter substantially equal to the uniform diameter in a longitudinal direction of the second refrigerant passages.

* * * * *